United States Patent [19]

Sato et al.

[11] 4,198,793
[45] Apr. 22, 1980

[54] METHOD OF PLANTING ROD-SHAPED MEMBER IN FOUNDATION

[75] Inventors: Takeshi Sato, Kobe; Isao Sakamoto, Takarazuka; Katsuaki Okamoto, Kobe; Hiroji Tada, Himeji, all of Japan

[73] Assignee: Nippon Jikkou Kabushiki Kaisha, Kobe, Japan

[21] Appl. No.: 933,745

[22] Filed: Aug. 15, 1978

[51] Int. Cl.² .............................................. E02D 5/74
[52] U.S. Cl. ....................................... 52/166; 52/742; 52/743
[58] Field of Search ................ 52/743, 742, 741, 295, 52/166; 405/259, 260

[56] References Cited

U.S. PATENT DOCUMENTS

| | | | |
|---|---|---|---|
| 3,289,369 | 12/1966 | Marcus | 52/295 |
| 3,762,117 | 10/1973 | Horvath | 52/295 X |

Primary Examiner—James A. Leppink
Assistant Examiner—Carl D. Friedman
Attorney, Agent, or Firm—Eugene E. Geoffrey, Jr.

[57] ABSTRACT

The method of affixing a bolt in a hole in foundations formed of materials such as concrete, stone or rock, wood and the like which includes inserting a bolt in said hole, filling the space surrounding said bolt with a plurality of balls, pouring a liquid curable resin into the hole to fill the interstices between the balls and then curing the resin and the resulting structure.

9 Claims, 4 Drawing Figures

(A)

(B)

METHOD OF PLANTING ROD-SHAPED MEMBER IN FOUNDATION

This invention relates to a method of planting a rod-shaped member in a foundation such as a rock or concrete base and the resulting structure. This method and structure are especially useful for plantation of an anchor bolt which has to bear a large tensile force, for example, in building construction.

In case of planting an anchor bolt in a foundation in accordance with the prior art, it has been the general practice to bore a hole in the foundation, put the bolt therein and then fill the remaining space in the hole with a filling material such as cement or mortar. However, such prior art techniques have not been advantageous in that it is necessary to bore a very deep hole in order to achieve the allowable strength required under the Industrial Standard and that it takes a significantly long time for the filling material to harden and exhibit sufficient strength. In addition to the laborous and time-consuming work, it has been almost impossible to correct the position of the bolt after fillint the hole with the filling material.

Accordingly, an object of this invention is to provide a novel and improved method and structure for planting a rod-shaped member, such as anchor bolt, in a foundation, such as rock or concrete, which can greatly improve facilitation and efficiency of work and reduce the term thereof, by removing the abovementioned disadvantages.

According to this invention, the method of planting a rod-shaped member in a foundation comprises the steps of forming a hole with an inner diameter greater than the outer diameter of said member in the foundation, inserting an end of said member in said hole, filling the remaining space in the hole with a plurality of ball-like members having substantially uniform diameters, adding a liquid synthetic resin material and, then, heardening the synthetic resin material.

Other objects and features of this invention will be described in more detail hereinunder with reference to the accompanying drawings and in conjunction with some examples.

IN THE DRAWINGS

EXAMPLE 1

Figure 1:
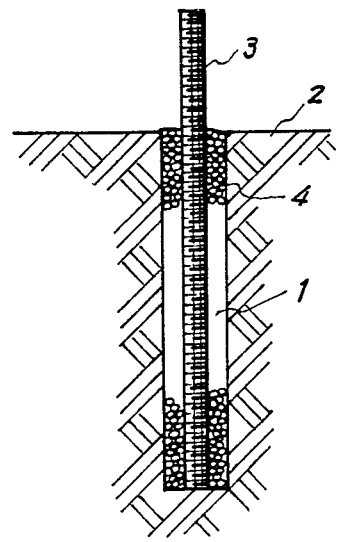
FIG. 1 is a schematic cross sectional view representing a threaded bolt planted in a base rock according to an embodiment of this invention.

Referring to FIG. 1, a cylindrical hole 1 having an inner diameter of 42 millimeters and a depth of 250 millimeters was formed in a base rock 2 using a boring machine. After cleaning the interior of the hole with a vacuum cleaner, a threaded bolt 3 having an outer diameter of 16 millimeters and a length of 330 millimeters was inserted in the hole 1. Alumina ceramic balls 4 each having a diameter of about 5 millimeters, the balls being available commercially for use in a ball-mill pot, were put in the hole 1 to about one third of the depth of the hole to cause the bolt 3 to become selfsupporting, so that position correction of the bolt could be effected easily. After correcting the position of the bolt 3, a composition consisting of epoxy resin of bisphenol A (2,2-bix(4'-hydroxyphenol)propane) type as main component and m-xylylenediamine as hardener was poured in the hole 1 to the same level as the balls 4. Then, similar balls 4 were added in the hole 1 to the surface of the base rock 2 and the same composition was poured to the same level as shown. Although a part of the balls were omitted from the drawing for specification, it should be noted that they are completely packed in the space of the hole 1. Thereafter, a final correction of the bolt position was executed and the structure was left as it was for about 72 hours at room temperature to harden the resin composition.

A tension test was carried out by clutching the bolt 3 to pull it out, and resulted in breakage of the bolt at 7,500 kilograms.

When the same test was carried out using conventional mortar as the filling material, the bolt was easily pulled out without breakage of either the bolt or the hardened mortar. In order to obtain the same result as this example, it was necessary not only to make the depth of the hole more than three times in order to afford the necessary frictional resistance of the bolt but it was also necessary to greatly increase the diameter of the hole to facilitate pouring the mortar having much lower fluidity.

EXAMPLE 2

Figure 2:
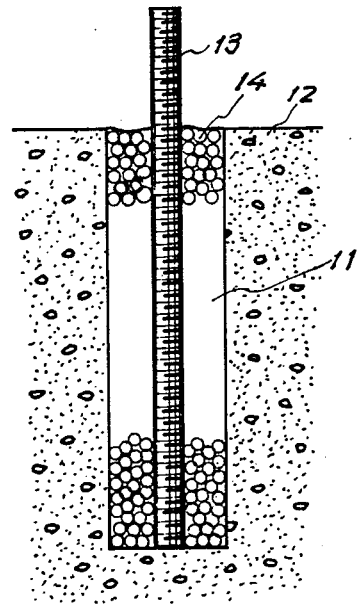
FIG. 2 is a schematic cross sectional view representing a threaded bolt planted in a concrete base according to another embodiment of this invention.

Referring to FIG. 2, a square hole 11 was previously formed in a concrete foundation 12. The hole had a depth of 350 millimeters and a square cross-section of 100×100 millimeters. An anchor bolt 13 having an outer diameter of 25 millimeters and a length of 450 millimeters was planted in the hole 11 with the filling material of 10 millimeter glass balls 14 and a resin composition similar to that of Example 1. The plantation procedure was substantially similar to that of Example 1. After the resin composition was hardened for about 72 hours, a motor base (not shown) was fixed by the bolts 13 on the foundation and rotation of the motor was started immediately. Trouble has not been encountered and the installation has already been functioning for three months.

EXAMPLE 3

Figure 3:
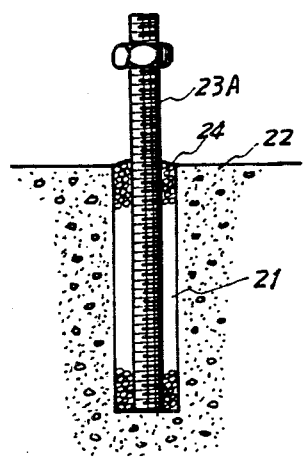
FIGS. 3(A) and 3(B) are similar cross sectional views representing two kinds of bolts planted in a concrete base for comparison test.
Figure 3:
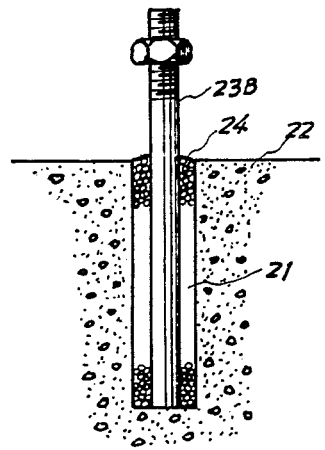

Referring to FIG. 3(A), cylindrical holes 21 were formed in a concrete foundation 22. While the diameters of the holes 21 were maintained at 42 millimeters, depths of 200, 300 and 400 millimeters were used. Steel bolts 23A each having a diameter of 16 millimeters and a tensile strength of about 45 kilograms per square millimeter and being threaded over the whole length was planted in each hole with filling materials of 6 millimeter alumina ceramic balls 24 and an epoxy resin composition used in the above examples. The plantation process was carried out in the same manner as in Example 1.

Another group of specimens was prepared similarly to the above except that each steel bolt 23B was not threaded over the lower portion to be embedded in the hole as shown in FIG. 3(B).

Six specimens were prepared for each specific condition and tensile strengths were measured after 72 hours for the specimens 1, 2 and 3 and after 168 hours for the specimens 4, 5 and 6. The result of the measurements was summarized in the following table. In the table, the symbols A and B correspond respectively to the bolts 23A and 23B in FIG. 3.

TABLE

| Depth | 200 mm | | 300 mm | | 400 mm | |
| --- | --- | --- | --- | --- | --- | --- |
| Spec. | A | B | A | B | A | B |
| 1 | 11,800(a) | 7,100(a) | 13,400(a) | 12,800(b) | 16,000(c) | 17,500(c) |
| 2 | 11,500(a) | 6,900(a) | 13,800(b) | 12,100(b) | 15,700(c) | 17,800(c) |
| 3 | 11,500(a) | 7,000(a) | 13,500(b) | 12,500(b) | 15,500(c) | 16,900(c) |
| 4 | 12,000(b) | 7,200(a) | 13,500(b) | 13,000(b) | 15,800(c) | 19,800(c) |
| 5 | 11,800(b) | 7,000(a) | 14,000(c) | 12,500(b) | 16,000(c) | 19,500(c) |
| 6 | 11,500(a) | 6,900(a) | 14,000(b) | 12,500(b) | 15,000(c) | 20,300(c) |

The numerical values in the table represent breaking loads in kilograms and the symbols (a), (b) an (c) represent the breaking conditions or states, wherein (a) corresponds to peeling off between the foundation and filling material, (b) corresponds to breakage of concrete and (c) corresponds to breakage of bolt.

The above result shows very small dispersion of the measured values of three specimens and ensures reliability of the method. It also shows that a sufficient strength can be obtained above 400 millimeters in depth and above 72 hours curing time in this example. It has been confirmed that depth more than 1,000 millimeters and curing time more than one week are required for obtaining the similar result and that the dispersion of the measured values is much greater and lower reliability is anticipated, when conventional mortar is used as the filling material.

Gravel, sand and crushed stone were tested as substitutes for the ceramic balls in the resin composition. However, the results showed much inferiority as compared with the ceramic balls in both mean value and dispersion of the measured tensile strengths. Moreover, it was found that the use of these filling materials made it difficult to move the bolt for position correction and also interfered with the expelling of air bubbles.

Glass balls and steel balls substituted for the ceramic balls showed a little inferior results. This is believed to be due to smoothness of the ball surfaces. Among many kinds of balls which were tested, alumina ceramic balls which were non-glazed and commercially available for use in a ball mill were found to be preferable.

In the above examples, bisphenol A epoxy resin having viscosity of about 185 centipoises at 20° C. was used together with hardener. However, it should be self-evident to those skilled in the art that other moldable resins such as polyester resin, phenol-formaldehide resin, melamine resin, polyvinyl chloride resin and polyvinylidene resin, which exhibit minimum volumetric shrinkage, are also useful.

It has been found that the tensile strength tends to increase with reduction of ball size, that is, with increase in packing density of the balls. However, the packing density is limited in practice because it becomes difficult to drive the viscous resin composition into small cavities between the balls. Repeated tests have showed that the gap between the bolt and the hole wall should preferably be at least 1.5 times the ball diameter. This suggests that the improved strength obtained in accordance with the method of this invention has come from frictional resistance between the balls and, therefore, that it is desired to establish a hexagonal close-packed structure throughout the balls in order to obtain maximum strength. For completeness of this structure, it is desired that the balls be as uniform in diameter as possible and that each ball be ideally spherical. Compressive strength of the ball should be large enough to overcome the tensile load, that is, at least greater than that of the foundation material.

Although the method of this invention was described above in conjunction with certain embodiments, it should be noted that various modifications and changes can be made without departing from the scope of this invention. For example, this method can be applied also to other foundations such as wood and stone in addition to the aforementioned concrete and base rock.

What is claimed is:

1. A method of planting a rod-shaped member in a foundation, comprising the steps of forming a hole which is greater in cross-section than said rod-shaped member in said foundation, putting said rod-shaped member in said hole, filling the remaining space in said hole with a plurality of ball-like members which are substantially uniform in diameter and a liquid curing resin material, and hardening solid resin material.

2. A method according to claim 1, including the step of forming said ball-like members of a ceramic material.

3. A method according to claim 1, including the step of forming said resin material by combining bisphenol A epoxy resin with a hardener.

4. A method according to claim 1, wherein the diameter of said ball-like members is selected so as to establish a hexagonal close-packed structure with at least a part of said ball-like members in said hole.

5. A method according to claim 1, including the step of threading said rod-shaped member before insertion into said hole and said foundation is concrete or base rock.

6. Means for securing a rod-shaped anchor in a hole formed in a foundation of concrete, rock, stone and the like comprising an elongated anchoring rod extending from the base of said hole to a point above the surface of the foundation, said hole having a diameter substantially greater than said rod and a plurality of ball-like members filling said hole about said anchoring rod and a cured resinous material filling the interstices between said ball-shaped members and between said ball-shaped members and the wall of said hole.

7. Means for securing a rod-shaped anchor according to claim 6 wherein said balls are formed of a ceramic material.

8. Means for securing a rod-shaped anchor according to claim 6 wherein said cured resin contains a bisphenol A epoxy.

9. Means for securing a rod-shaped anchor according to claim 6 wherein said rod has a threaded surface.

* * * * *